United States Patent
Goeltenbodt

(10) Patent No.: US 10,532,409 B2
(45) Date of Patent: Jan. 14, 2020

(54) DEVICE FOR HOLDING TOOLS

(71) Applicant: Goeltenbodt Praezisionswerkzeung—und Maschinefabrik GmbH & Co., Leonberg (DE)

(72) Inventor: Dieter Goeltenbodt, Leonberg (DE)

(73) Assignee: Goeltenbodt Praezisionswerkzeug—und Maschinenfabrik GmbH & Co., Leonberg (DE)

( * ) Notice: Subject to any disclaimer, the term of this patent is extended or adjusted under 35 U.S.C. 154(b) by 0 days.

(21) Appl. No.: 15/781,779

(22) PCT Filed: Nov. 23, 2016

(86) PCT No.: PCT/EP2016/078508
§ 371 (c)(1),
(2) Date: Jun. 6, 2018

(87) PCT Pub. No.: WO2017/097588
PCT Pub. Date: Jun. 15, 2017

(65) Prior Publication Data
US 2018/0361487 A1 Dec. 20, 2018

(30) Foreign Application Priority Data
Dec. 7, 2015 (EP) .................................. 15198279

(51) Int. Cl.
*B23B 29/04* (2006.01)
*B23Q 11/10* (2006.01)
*B23B 29/26* (2006.01)

(52) U.S. Cl.
CPC .............. *B23B 29/26* (2013.01); *B23Q 11/10* (2013.01)

(58) Field of Classification Search
CPC ..... B23B 27/1666; B23B 29/04; B23B 29/26; B23Q 11/10; B23Q 1/0018
See application file for complete search history.

(56) References Cited

U.S. PATENT DOCUMENTS

| 4,510,829 A | * | 4/1985 | Kintzel | ................... B23B 29/04 82/158 |
| 4,759,244 A | * | 7/1988 | Engibarov | .............. B23B 29/04 407/87 |

(Continued)

FOREIGN PATENT DOCUMENTS

| DE | 200 20 618 U1 | 3/2001 |
| DE | 20 2009 015 318 U1 | 3/2010 |

OTHER PUBLICATIONS

International Search Report of PCT/EP2016/078508, dated Feb. 22, 2017.

*Primary Examiner* — Sara Addisu
(74) *Attorney, Agent, or Firm* — Collard & Roe, P.C.

(57) ABSTRACT

A device for holding tools for machine tools, includes at least one interchangeable holder and one base holder. Each interchangeable holder includes two interchangeable-holder guiding elements which are engaged with base-holder guiding elements of the base holder. Furthermore, each interchangeable holder comprises an interchangeable-holder coolant channel comprising an interchangeable-holder coolant-channel opening in one of the interchangeable-holder guiding elements, which comes into contact with a base-holder coolant-channel opening of a base-holder coolant channel, which is arranged on a base-holder guiding element. First guiding elements—either the interchangeable-holder guiding elements or the base-holder guiding elements—have a convex semicircular cross-section. The cross-section has a flat area containing the vertex of the semicircle, or it has two widened areas which are arranged (Continued)

in mirror symmetry on the semicircle. The guiding elements that engage with the first guiding elements have a concave circular-sector-type cross-section with a central angle of less than 180°.

14 Claims, 12 Drawing Sheets

(56) References Cited

U.S. PATENT DOCUMENTS

| | | | | |
|---|---|---|---|---|
| 5,174,697 A * | 12/1992 | Ariyoshi | ............... | B23B 29/04 408/147 |
| 9,352,396 B2 * | 5/2016 | Hankey | ............... | B23B 29/24 |
| 2006/0225544 A1 * | 10/2006 | Uebelhart | ............... | B23B 29/323 82/138 |
| 2007/0101839 A1 * | 5/2007 | Travez | ............... | B23B 29/04 82/158 |

* cited by examiner

DEVICE FOR HOLDING TOOLS

CROSS REFERENCE TO RELATED APPLICATIONS

This application is the National Stage of PCT/EP2016/078508 filed on Nov. 23, 2016, which claims priority under 35 U.S.C. § 119 of European Application No. 15198279.0 filed on Dec. 7, 2015, the disclosure of which is incorporated by reference. The international application under PCT article 21(2) was not published in English.

The present invention relates to a device for holding tools for processing machines.

PRIOR ART

Cutting processing machines, such as multi-spindle machines or long-turning lathes, for example, have change holders for their respective processing tools, such as lathe tools, for example. The change holders are fixed in a base holder in a highly precise position. For example, depending on the processing tool or the workpiece to be processed, the change holders can be positioned on guides against an adjustable stop in order to bring them into different relative positions. This can be guaranteed by high precision guides that represent precision-processed, rail-like guide projections with change holders in a semi-circular shape, for example, said guide projections engaging in corresponding precision-processed sliding grooves on the respective base holder that also have a semi-circular shape. In doing so, the change holder can be shifted along the base holder while the distance between the tool and the workpiece is securely maintained for the precision movement of the sliding projections and sliding grooves engaging in one another.

When using cutting processing machines, the workpiece or the tool cutting edge is cooled in the region of the respectively setting tool by means of a coolant. The coolant can be guided to the tool via coolant lines arranged in an outer region of the base holder and the change holder.

A device for processing machines for converting to other tools and for pre-setting the tools is described in DE 20 2009 015 318 U1. This device enables a quick change of tools by a change holder provided with a tool being exchanged on a base holder. Coolant channels run in the base holder and in the change holder, wherein, in the mounted state, the base holder and the tool holder are fluidically connected to each other. To do so, several coolant outlet openings are provided on the base holder. At least one of these openings is fluidically connected to a coolant outlet opening in the mounted state. The other openings have to be sealed with sealing plugs.

A device for holding processing tools for cutting processing machines is known from DE 200 20 618 U1, said device providing coolant channels running in the base holder and in the change holder. The transfer of the coolant from the base holder to the change holder takes place in the region of the sliding projections and sliding grooves. Openings are respectively provided in these that are connected to the coolant channels. When applying the change holder to the base holder, these openings are made congruent. Soft seals made of plastic are provided in the region of the sliding grooves to seal the coolant transfer region. However, these soft seals only ensure a secure sealing with low and average coolant pressures. Very high coolant pressures cannot be transferred in this manner. Furthermore, the soft seals negatively affect the location accuracy of device. They represent a delicate and maintenance-intensive sealing part that is subject to an aging process.

An object of the present invention is to provide a device for holding tools which has coolant lines in the base holder and in the change holder, such that a coolant transfer is possible without external coolant lines and one that can also be operated with very high coolant pressures without the disadvantages of a soft seal.

DISCLOSURE OF THE INVENTION

This object is solved by the device according to the invention for holding tools for processing machines. It has a base holder and at least one, in particular several, change holders. Each change holder has two change holder guiding elements that are in engagement with base holder guiding elements of the base holder. Furthermore, each change holder has a change holder coolant channel which has a change holder coolant channel opening in one of the change holder guiding elements. This contacts a base holder coolant channel opening of a base holder coolant channel, said opening being arranged on a base holder guiding element.

In order to seal the fluidic connection between the two coolant channel openings, it is provided that first guiding elements, which are either the change holder guiding elements or the base holder guiding elements, have a convex semi-circular cross-section, which deviates regionally from the semi-circular shape. In a first embodiment of the invention, the convex semi-circular cross-section has a flattened region which includes the vertex of the semicircle. "Flattened" is to be understood to mean that the radius of the cross-section in this region is reduced in comparison to the semi-circular shape. In a second embodiment of the invention, the convex semi-circular cross-section has two widened regions that are arranged mirror-symmetrically on the semicircle. "Widened" is to be understood to mean that the radius of the cross-section in this region is enlarged in comparison to the semi-circular shape. These geometries of the first guiding elements ensure that the cross-section of the first guiding elements in each of the two embodiments respectively abuts on two points on the two guiding elements. By fixedly pressing the first guiding elements onto the second guiding elements, a tight connection between the two coolant channels can be created, avoiding a soft seal, said connection preventing coolant escaping even with high coolant pressures up to 200 bar, for example. By the soft seal and its fixing being able to be avoided, it is possible to reduce the construction width of the device according to the invention in comparison to devices having soft seal.

Second guiding elements, which are those guiding elements that are in engagement with the first guiding elements, have a concave circular sector-shaped cross-section having a centre angle of less than 180°. By the second guiding elements not having a semi-circular cross-section but rather only a circular sector-shaped cross-section with a reduced centre angle in comparison to the semicircle, the guiding elements can be simply separated from one another again despite the particular geometry, which is provided for sealing the coolant connection.

In the first embodiment, it is preferred that the flattened region has a centre angle ranging from 10° to 12°. Furthermore, it is preferred that the width of the flattened region ranges from 0.7 to 0.8 mm. This geometry causes a particularly secure sealing of the coolant connections.

In the second embodiment of the invention, it is preferred that the centre point of each widened region forms an angle ranging from 40° to 65° with the vertex of the semicircle. Furthermore, it is preferred that the width of each widened region ranges from 0.2 to 0.3 mm. This geometry also causes a particularly secure sealing of the coolant transfer.

The width of the flattened region or the width of the widened region is to be understood in each case as the length of the linear connection between the two points at which the semi-circular cross-section begins to deviate from the semi-circular geometry.

In the first embodiment of the invention, the convex semi-circular cross-section is flattened in the flattened region at the vertex of the semicircle, preferably by a flattening of 4 μm to 8 μm with respect to the semicircle. In the second embodiment of the invention, the convex semi-circular cross-section is widened at the centre of each widened region by a widening of 4 μm to 8 μm with respect to the semicircle. This flattening or widening leads to support points on the cross-section of the first guiding elements, which are particularly well suited to sealing the fluidic connection between the coolant channels.

The centre angle of the concave circular-sector shaped cross section preferably ranges from 140° to 144°. This range is small enough to enable a simple separation of the guiding elements and, at the same time, large enough to ensure a secure connection between the change holders and the base holder.

When the circular-sector shaped cross-section transfers into a horizontal course of the holder at its ends, said course having the second guiding elements, then this leads to a gap emerging between the base holder and the changer holders. In order to avoid the formation of this gap, it is preferred that, in each case, a linear section of the cross-section attaches to the two ends of the concave circular-sector shaped cross-section. Particularly preferably, the angle between a connection of the vertex of the concave circular-sector shaped cross-section to the circle centre of the circular sector and the linear sections ranges in each case from 16° to 20°. A linear section formed in such a way, which can also be called a chamfer, does not prevent the separation of the change holder from the base holder. However, it leads to the gap between the base holder and the change holder being closed. This has the advantage that a holder, which does not have any first guiding elements, can be placed on a holder having two guiding elements at the same height, such as a holder that engages with its first guiding elements into the second guiding elements of the other holder.

Preferably, at least one change holder coolant channel opening has the shape of an elongated hole whose longitudinal axis runs along the longitudinal axis of its change holder guiding element. Furthermore, it is preferred that at least one base holder coolant channel opening has the shape of an elongated hole whose longitudinal axis runs along the longitudinal axis of its base holder guiding element. As a result of this geometry of the coolant channel openings, a covering of the coolant channel openings via a large adjusting region between base holder and change holder can be ensured. In this manner, it is thus ensured that the adjusting region between base holder and change holder is not limited by having to take a limited covering region of the coolant channel openings into consideration.

Preferably, the first guiding elements are change holder guiding elements and the second guiding elements are base holder guiding elements. By the change holders being given a larger volume by a convex geometry of their guiding elements, particular embodiments of the device according to the invention can be achieved which are described below.

Thus, in each case, a data carrier can preferably be arranged in the change holders in such a way that it is arranged at least partially in a change holder guiding element which does not have a change holder coolant channel opening. Here, use is made of the fact that a large free volume is available in the region of a convex change holder guiding element, which is not connected to a change holder coolant channel, said volume enabling the housing of the data carrier. This data carrier can be implemented as an RFID chip, for example, which enables a contactless identification of the change holder.

In an embodiment of the device according to the invention, which is particularly suitable for long-turning lathes, the change holders each have a change holder connection opening having an undercut between their two change holder guiding elements. This engages with a base holder projection of the base holder, which is arranged between two base holder guiding elements. The base holder projection has, in particular, a diamond-shaped cross section having an undercut. The base holders each have one eccentric screw per change holder. The screw head of the eccentric screw is arranged in a screw opening of a change holder. The screw shaft is arranged in a linear threaded opening of the base holder. The longitudinal axis of the threaded opening runs at an angle in the direction of the base holder projection. A change holder separate from the base holder can firstly be arranged loosely on this by the base holder projection being inserted into the change holder connection opening, and the screw head being inserted into the screw opening. By tightening the eccentric screw, its screw head exerts a force on the screw opening, which is transferred to the change holder in such a way that the base holder projection is pressed fixedly into the undercut of the change holder connection opening. In this manner, the change holder can be fixedly pressed onto the base holder in such a way that a fluid-tight connection between the convex first guiding elements and the second concave guiding elements of the change holder is created.

In this embodiment, it is preferred that a fixing element is arranged in a linear fixing element opening. This runs through the base holder and a change holder in such a way that it ends in the change holder on the side of the change holder connection opening which faces away from the threaded opening. Its longitudinal axis is at an angle in the direction of the base holder projection. In particular, the end of the fixing element facing towards the change holder is formed as an elastic or spring element, which engages into the part of the fixing element opening that runs in the change holder. When a change holder is arranged on the base holder, then a pre-fixing of the change holder can already take place by means of the fixing element by the fixing element pressing into the section of the fixing element opening that is arranged in the change holder in such a way that the base holder projection engages with the undercut of the change holder connection opening. As a result, the change holder no longer has to be held by an operator when tightening the eccentric screw.

In another embodiment of the device that is particularly suitable for multi-spindle machines, the change holders each have a fixing element having first engaging elements that is arranged in each case in a receiving region of the base holder. Each individual fastening channel runs through the base body in such a way that it ends in the receiving region, wherein a fastening pin is arranged in the fastening channel, said pin having two engaging elements that engage with the first engaging elements. This enables a position-accurate fixing of the change holder on the base holder, wherein this is fixedly pressed onto the base holder in such a way that the fluid connection between the coolant channels of the base holder and the change holder is reliably sealed.

The first engaging elements are formed, in particular, as a set of teeth on a side face of the fixing element. The second engaging elements are formed, in particular, as a set of teeth on the end of the fastening pin. By the two sets of teeth engaging in each other, such a great force can be transferred to the fixing element by means of the fastening pin that the change holder is pressed fixedly onto the base holder.

On the end of the fastening pin facing away from the receiving region, a threaded head having an outer thread is preferably arranged in the fastening channel. Such a threaded head, which is designed as a component separate from the fastening pin, enables it to press the fastening pin onto the fixing element without it thus resulting in a rotation of the fastening pin. To do so, only the threaded head has to be rotated. Lacking a fixed connection between the threaded head and the fastening pin, the fastening pin cannot, however, be removed again from the fastening channel by rotating the threaded head out of the fastening channel. Therefore, it is further preferred that a spring channel is arranged in the base body in such a way that it ends in the fastening channel. A spring element is arranged in the spring channel in such a way that it engages into a spring opening of the fastening pin. Here, a spring element is to be understood to mean an element that is elastic along its longitudinal axis, such as a spiral spring, for example.

Furthermore, it is preferred that a securing opening extends through the base body in such a way that it ends in the fastening channel. Anti-rotation means can be arranged in the securing opening in such a way that they prevent a rotation of the fastening pin in the fastening channel.

SHORT DESCRIPTION OF THE DRAWINGS

Exemplary embodiments of the invention are depicted in the drawings and are explained in more detail in the description below.

FIG. 1b shows a transparent depiction of the change holder according to FIG. 1a.

FIG. 1e shows a front view of the change holder according to FIG. 1a.

FIG. 2b shows a detailed view from FIG. 2a.

FIG. 3c shows a front view of the base holder according to FIG. 3a.

EXEMPLARY EMBODIMENTS OF THE INVENTION

Figure 1A:
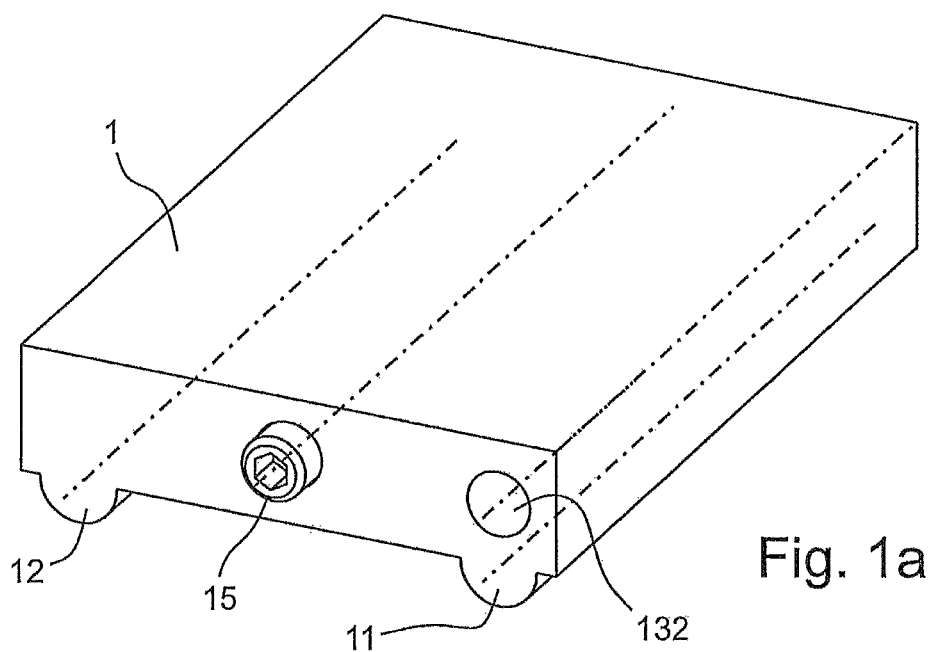
FIG. 1a shows a schematic isometric depiction of a change holder according to an exemplary embodiment of the invention.
Figure 1B:
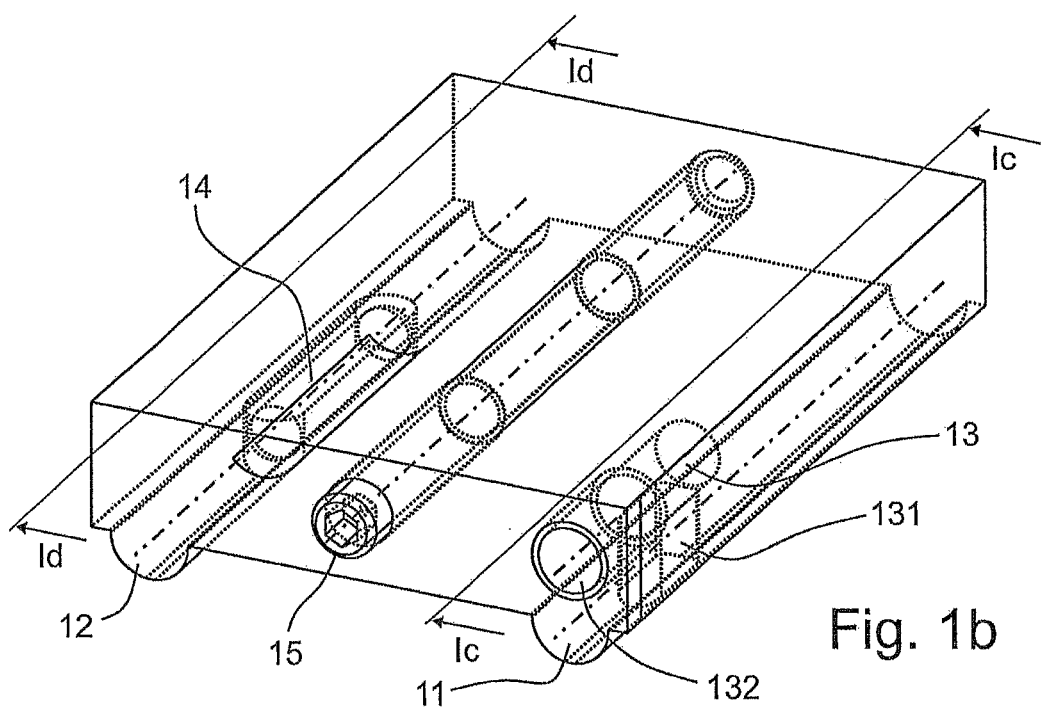
Figure 1C:
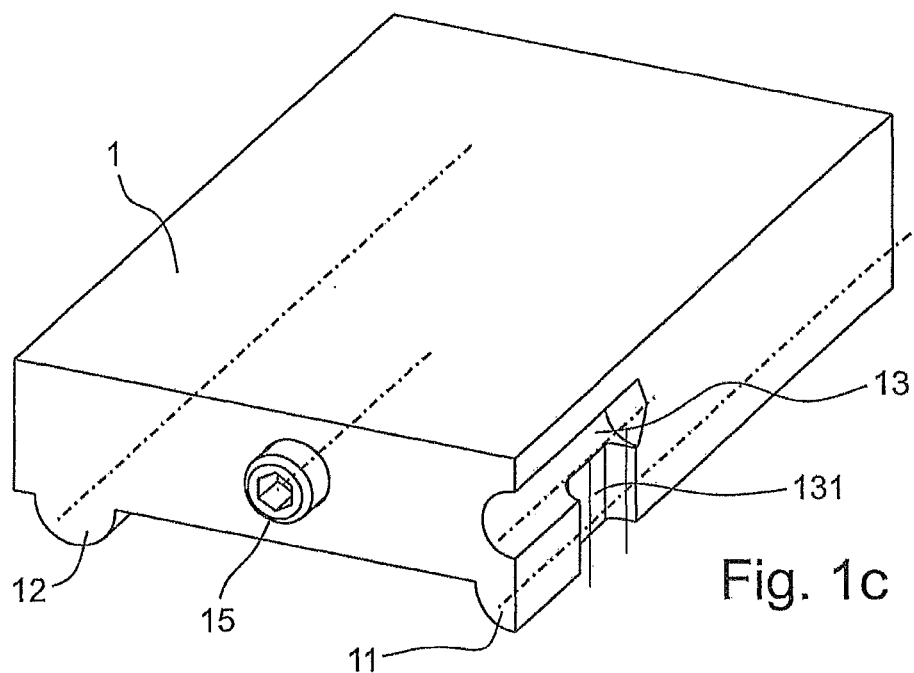
FIG. 1c shows a sectional depiction of the change holder according to FIG. 1a along the line Ic-Ic in FIG. 1b.
Figure 1D:
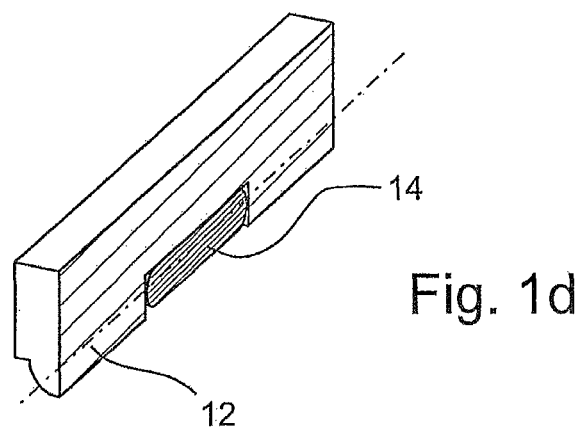
FIG. 1d shows a sectional depiction of the change holder according to FIG. 1a along the line Id-Id in FIG. 1b.
Figure 1E:
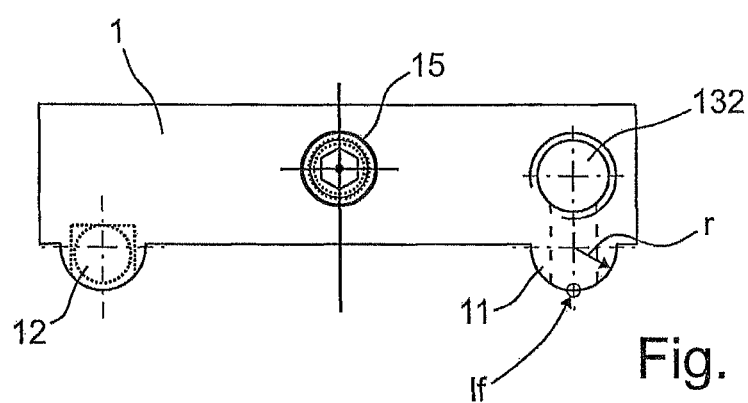
Figure 1F:
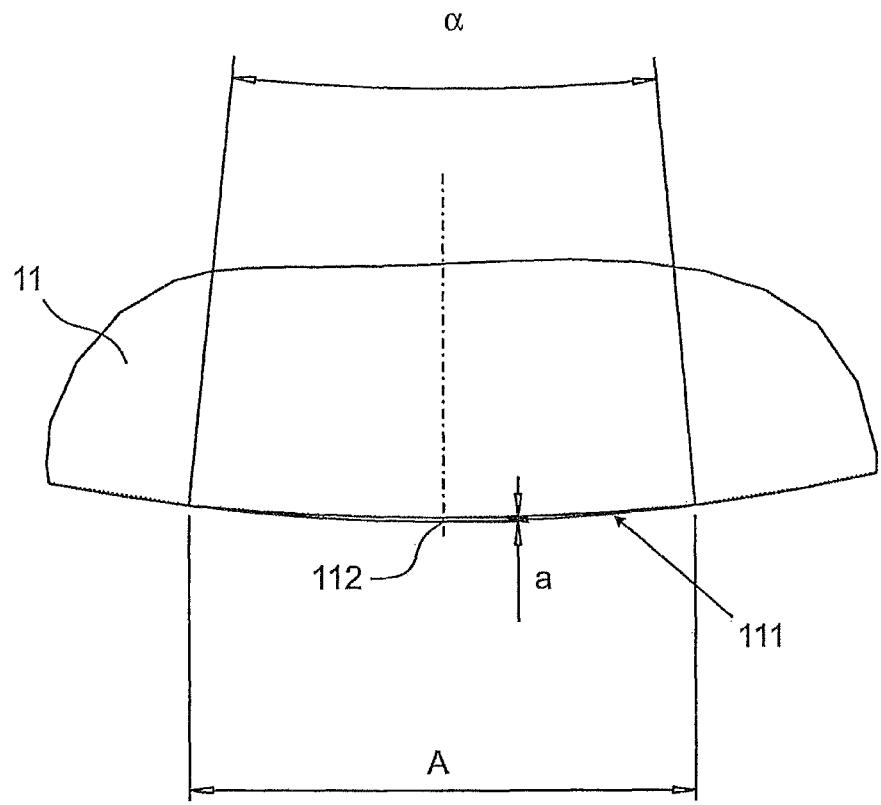
FIG. 1f shows a detailed view from FIG. 1e.

A first exemplary embodiment of the change holder 1 according to the invention is depicted in FIGS. 1a to 1f. This has two convex change holder guiding elements 11, 12 running in parallel. A change holder coolant channel 13 runs above the first change holder guiding element 11 in parallel to this in its inside. This has a circular cross-section. A change holder coolant channel opening 131, which is formed in the shape of an elongated hole, runs orthogonally to the change holder coolant channel 13 through the first change holder guiding element 11 and ends in its vertex. The change holder coolant channel 13 leaves this through an outlet opening 132 on the front side of the change holder 1. An RFID data carrier 14, whose longitudinal axis runs in parallel to the longitudinal axis of the second change holder guiding element 12, is arranged in this. A positioning screw 15 runs through the change holder 1 between the two change holder guiding elements 11, 12 in parallel to these. This is provided to accurately position the change holder 1 on a base holder. The two change holder guiding elements 11, 12 each have a semi-circular cross section having a flattened surface. This is depicted by way of example in FIG. 1f for the first change holder guiding element 11. The radius of the semi-circle is 4.000±0.002 mm in the present example. The radius is reduced in comparison to the ideal semicircle shape in a flattened region 11 that has a width A of 0.76 mm. The flattened portion a produced hereby is 6 μm in the vertex 112 of the cross section, such that the radius r of the semicircle at this point is still only 3.944 mm. The flattened portion is greater than the production tolerance of 2 μm. The borders of the flattened region 11 are formed by those points in which the ideal semicircle shape of the cross-section merges into a flattened contour. These two points form an angle α of 11° with the centre point of the semicircle.

Figure 2A:
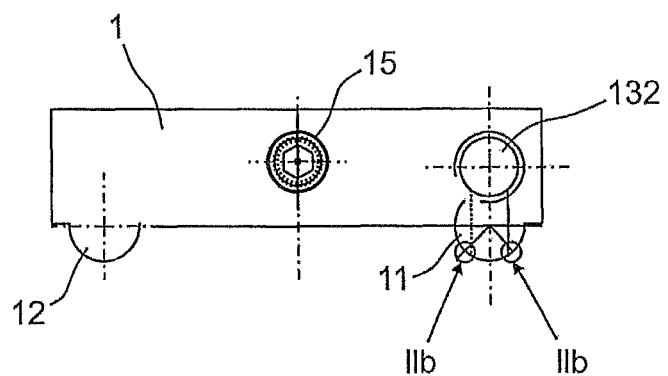
FIG. 2a shows a front view of a change holder according to another exemplary embodiment of the invention.
Figure 2B:
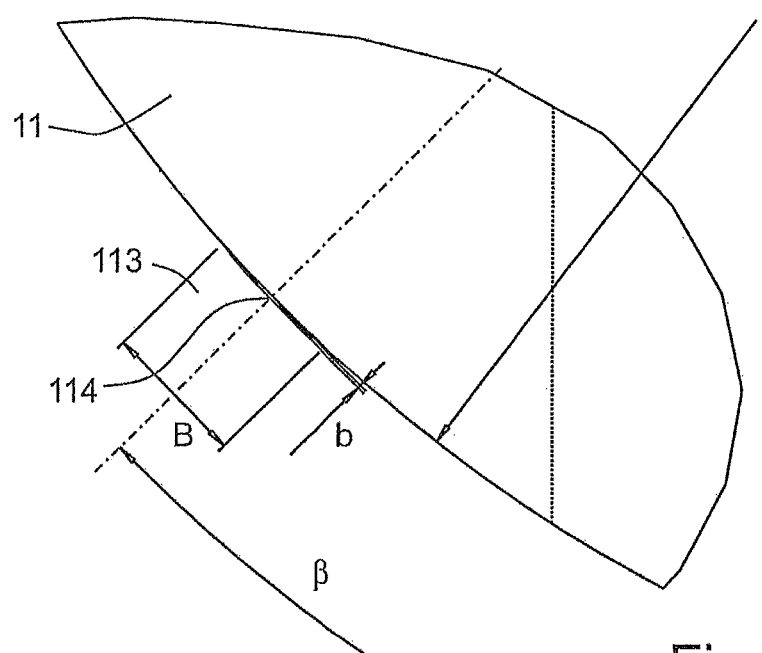
Figure 3A:
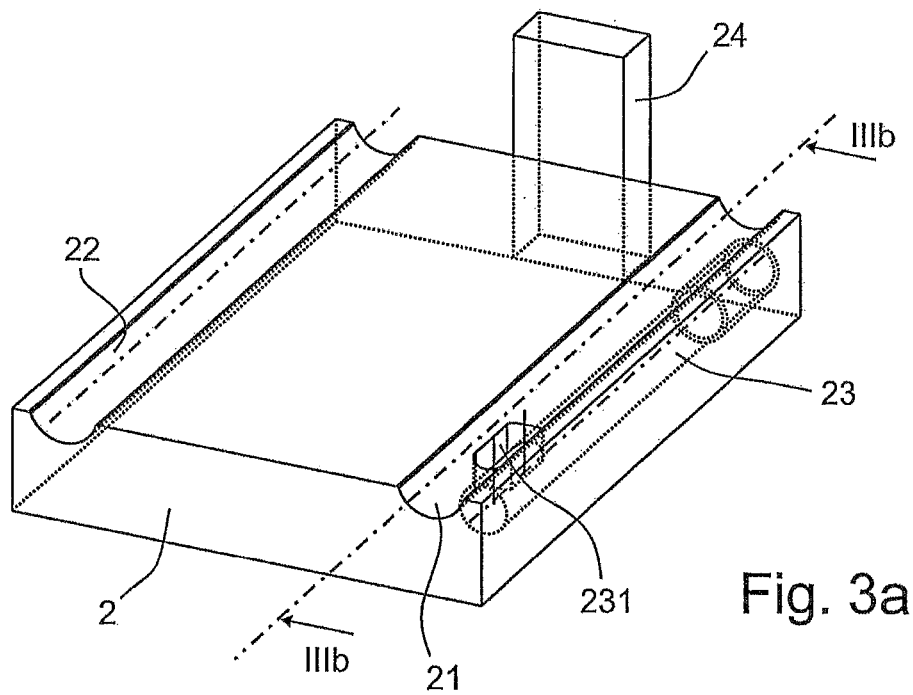
FIG. 3a shows a transparent isometric depiction of a base holder according to an exemplary embodiment of the invention.
Figure 3B:
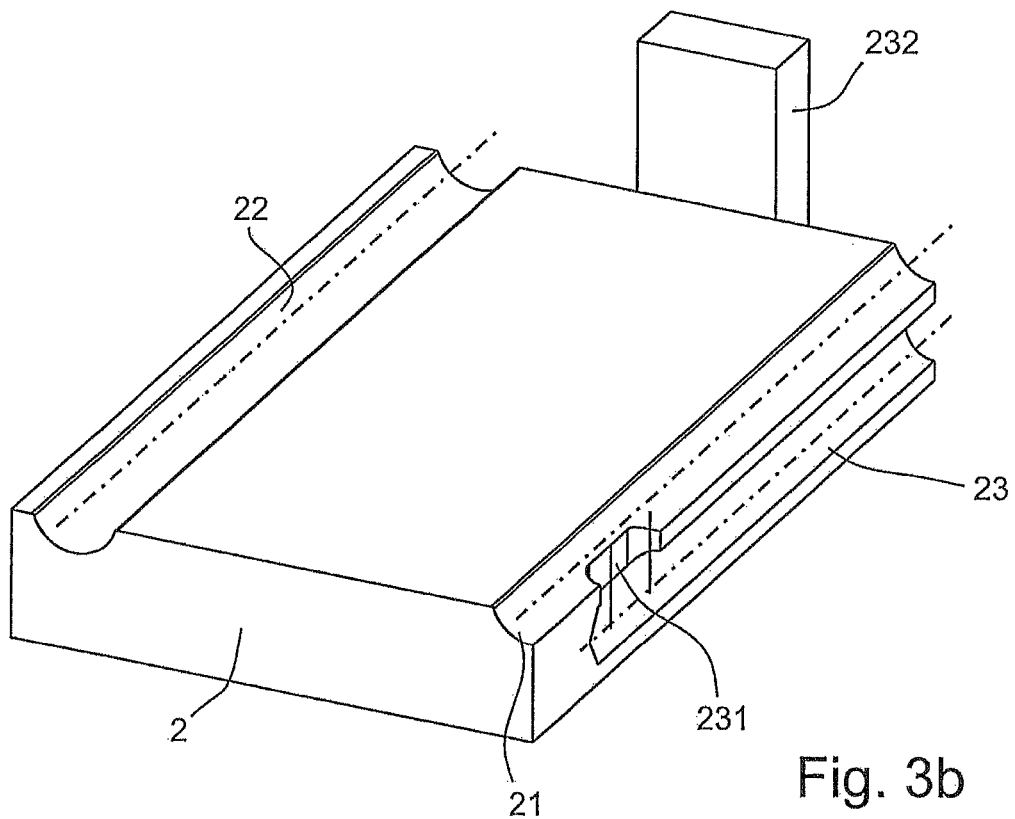
FIG. 3b shows a sectional depiction of the base body according to FIG. 3a along the line IIIb-IIIb.
Figure 3C:
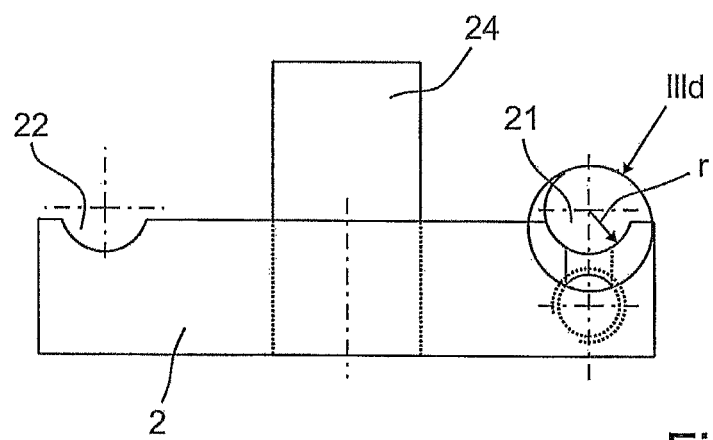
Figure 3D:
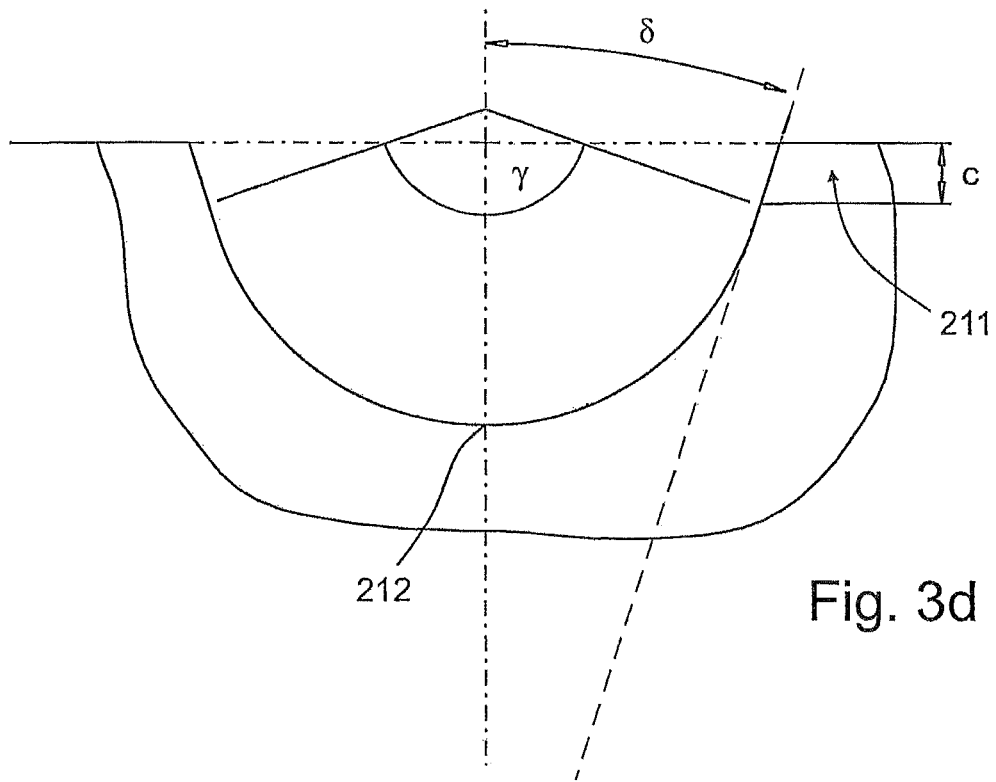
FIG. 3d shows a detailed view of FIG. 3c.

There is no flattened portion 111 in a second exemplary embodiment of the change holder 1 that is depicted in FIGS. 2a and 2b. Instead, the change holder guiding elements 11, 12 each have two widenings on an otherwise semi-circular cross-section. These are arranged mirror-symmetrically on the cross section of the change holder guiding elements 11, 12. A widened region 113 has a width B of 0.27 mm. The widening b is 6 µm in the centre point of the widened region 113, in which the difference between the radius of a perfect semicircle and the radius in the widened region 113 is the greatest. The radius r of the cross section is thus widened from 4.000 to 4.006 mm at this point. The centre point 114 of the widened region 113 and the vertex of the semi-circular contour form an angle β of 55° with the centre point of the semicircle.

A first exemplary embodiment of a base holder according to the invention is depicted in FIGS. 3a to 3d. The base holder 2 has two concave base holder guiding elements 21, 22 running in parallel. A base holder coolant channel 23, which runs in parallel to the first base holder guiding element 21, is arranged below this. A base holder coolant channel opening, which is formed in the shape of an elongated hole in such a way that the longitudinal axis of the elongated hole runs in parallel to the longitudinal axis of the first base holder guiding element 21, connects the concave surface of the first base holder guiding element 21 to the base holder coolant channel 23. A positioning stop 24 is arranged on one end of the base holder 2 between the two base holder guiding elements 21, 22. The concave contour of the base holder guiding elements 21, 22 has a circle sector-shaped region having a centre point angle γ of 142°. The radius r of this circle sector-shaped region is 4.000 mm in the present example. On its two sides, the circle sector-shape cross section merges into a linear section 211 of the cross section, which has a height c of 0.93 mm. The lengthening of the linear section forms an angle δ of 18° with the straight connecting lines between the centre point of the circle sector and the vertex 212 of the circle sector. The linear section 211 forms a chamfer.

Figure 4:
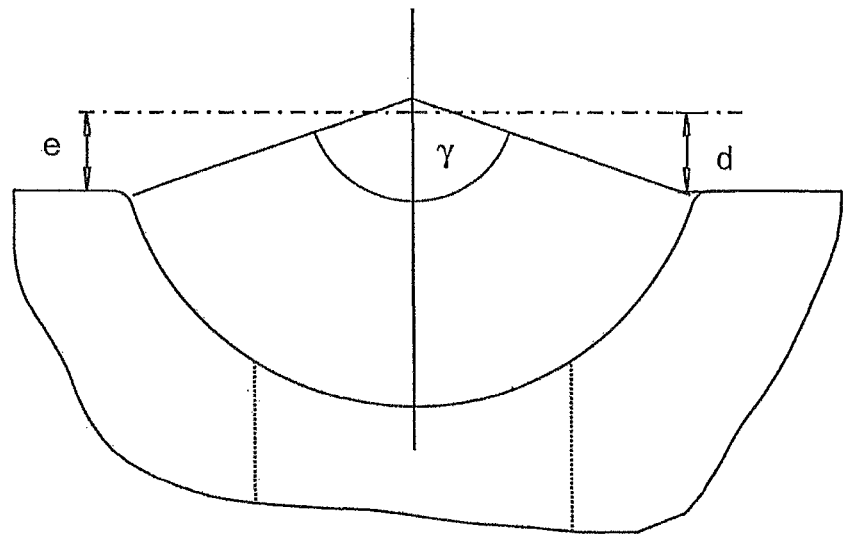
FIG. 4 shows a detailed view of a base holder according to another exemplary embodiment of the invention.

In a second exemplary embodiment of the base holder 2, as shown in FIG. 4, the cross section of the base holder guiding elements 11, 12 differs from the cross section according to the first exemplary embodiment in that there is no linear section 211. Instead, the cross-section merges into a rounding at a distance d of 0.94 mm, said rounding already merging into the horizontal at a distance e of 0.8 mm relative to the surface of the base holder 2 according to the first exemplary embodiment. Thus, the base holder 2 according to the second exemplary embodiment is lower than the base holder 2 according to the first exemplary embodiment.

Figure 5:
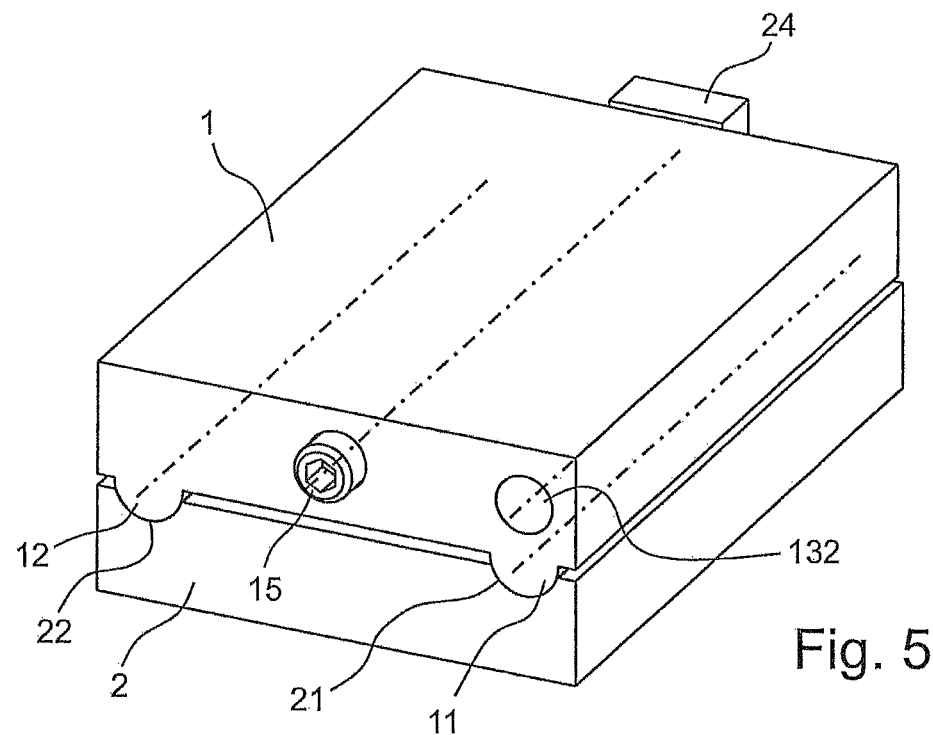
FIG. 5 shows a tool holder according to FIG. 1a, which is arranged on a base holder according to FIG. 3a, in an isometric depiction.

In FIG. 5, it is depicted how a change holder 1 according to its first or second exemplary embodiment is positioned on a base holder 2 according to the second exemplary embodiment thereof. The change holder coolant channel opening 131 is positioned on the base holder coolant channel opening 231 in such a way that this is at least partially covered. Because of the flattened region 11 or the widened regions 113, the cross-section of the change holder guiding elements 11, 12 rests in each case on two points on the cross section of the change holder guiding elements 21, 22, such that the connection between the coolant channel openings 131, 231 can be tightly sealed. Coolant provided in the base holder 2 can thus reach near the change holder through the base holder coolant channel 23. It is merged into the change holder coolant channel 13 via the base holder coolant channel opening 231 and the change holder coolant channel opening 131. It can be removed from this through the outlet opening 132. By tightening the positioning screw 15, which extends over the entire length of the change holder 1, this can be finely adjusted on the positioning stop 24 of the base holder 2. Since the cross section of the change holder guiding elements 11, 12, which is semi-circular apart from the flattened region 111 and the widened region 113, comes to rest in a cross-section of the base holder guiding elements 21, 22, which have only one circle sector cross-section having a centre point angle of less than 180°, there is a gap between the change holder 1 and the base holder 2. If the base holder 2 according to its first exemplary embodiment is used instead of the base holder 2 according to its second exemplary embodiment, then the upper side of the base holder 2 is shifted upwards relative to the upper side of the base holder 2 by 0.8 mm by means of the linear sections 211 according to its second exemplary embodiment, such that it abuts on the underside of the change holder 1 and the gap is closed.

Figure 6:
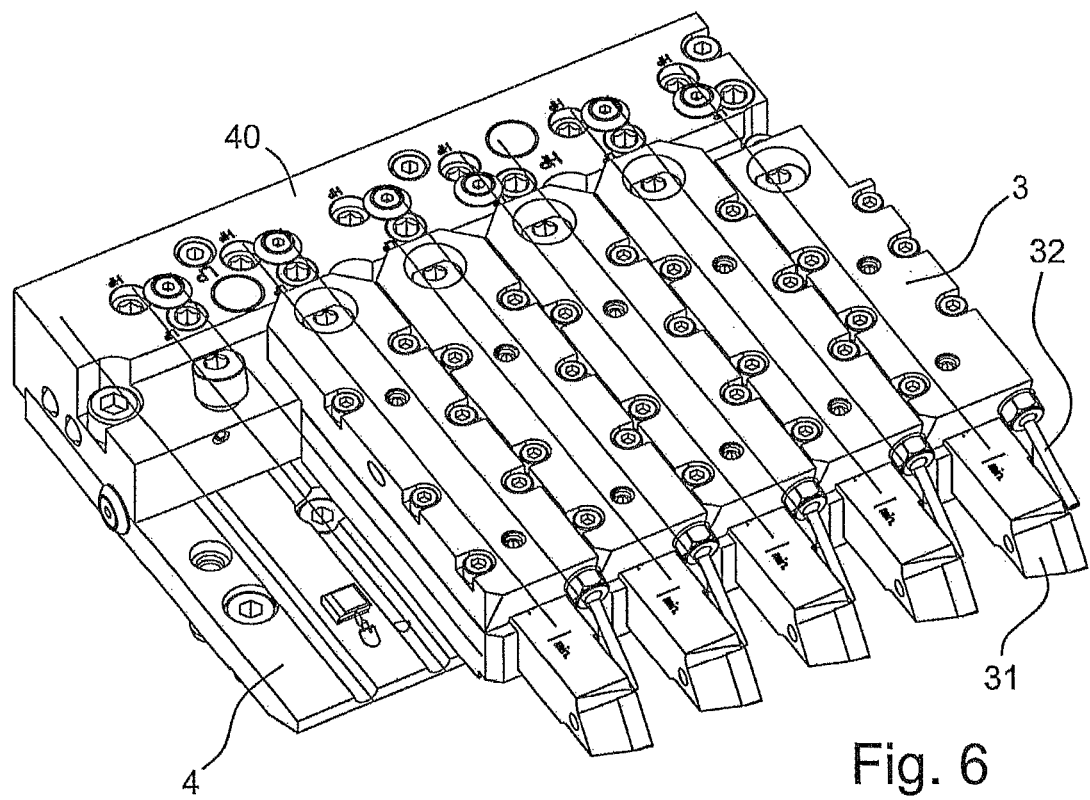
FIG. 6 shows an isometric depiction of a base holder having several change holders according to another exemplary embodiment of the invention.
Figure 7:
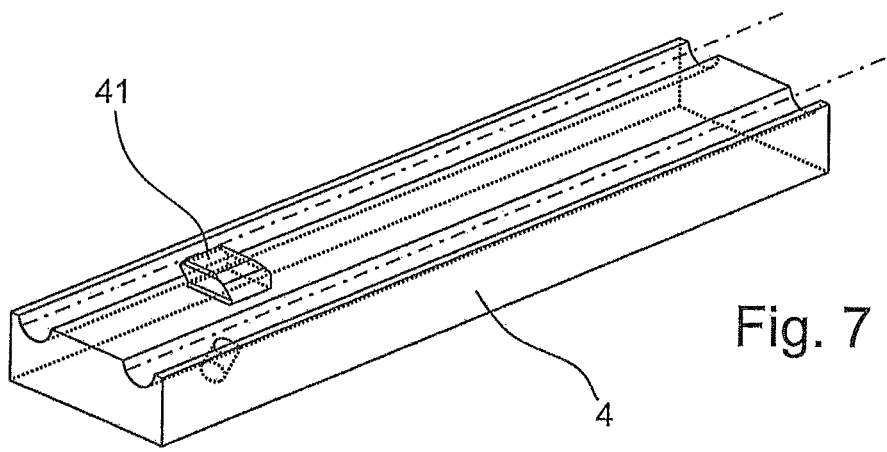
FIG. 7 shows a cut-out from the base holder according to FIG. 6 in an isometric depiction.
Figure 8A:
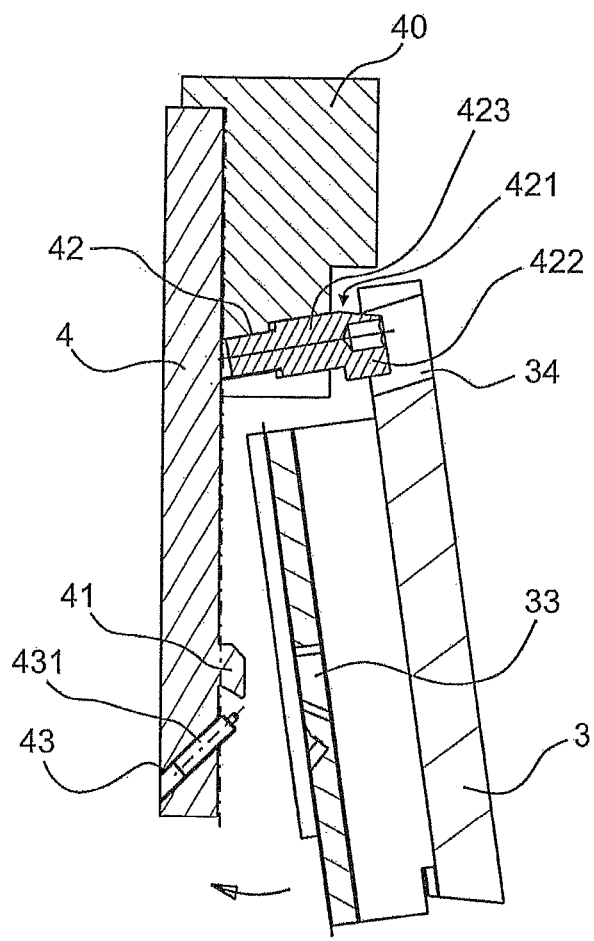
FIG. 8a shows a sectional depiction of a change holder that is arranged in a first arrangement position by the base holder according to FIG. 6.
Figure 8B:
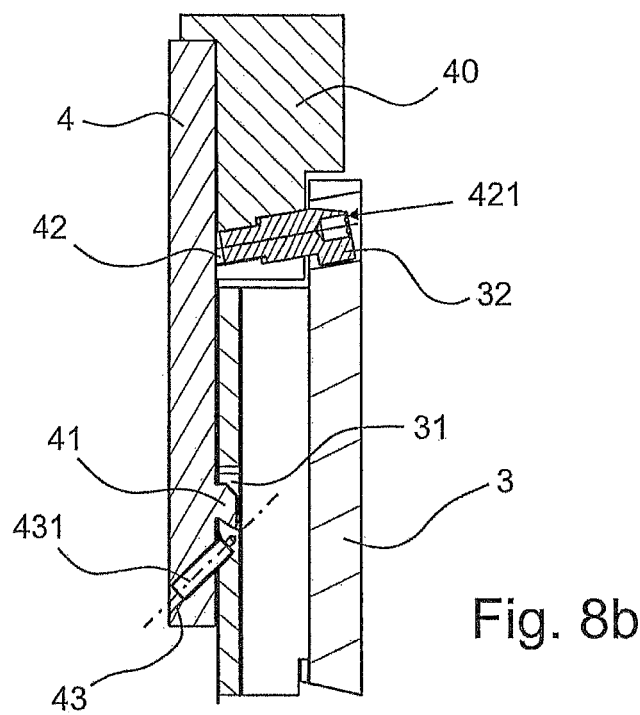
FIG. 8b shows the base holder and the changer holder according to FIG. 8a in a second arrangement position.
Figure 8C:
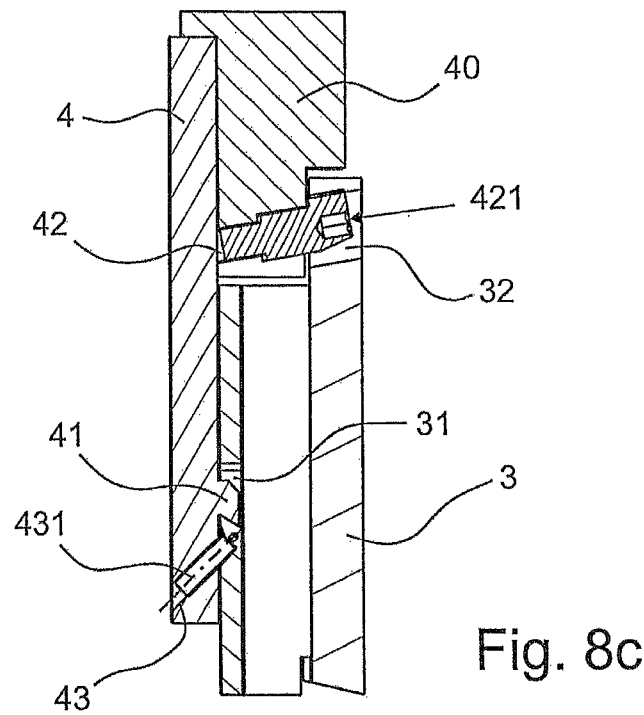
FIG. 8c shows the base holder and the change holder according to FIG. 8a in a third arrangement position.

Five of the original six change holders 3 are depicted in FIG. 6, which are positioned on a base holder 4 for a long-turning lathe. Each change holder 3 bears a lathe tool 31 as the tool. Furthermore, a coolant nozzle 32 is respectively arranged on the outlet of the change holder coolant channel. As depicted in FIG. 7, a base holder projection 41 is arranged between two concave base holder guiding elements of the base holder 4. This has a diamond-shaped cross-section, such that it has an undercut which is aimed in the direction of the lathe tool 31. A threaded opening 42 is arranged in a coolant bar, which functions as a positioning stop 40 of the base holder 4, in such a way that it is angled in the direction of the base holder projection 41. An eccentric screw 421 is arranged in this threaded opening 42 in such a way that its screw head 422 protrudes from the threaded opening 42, while its screw shaft 423 is received by the threaded opening 42. A fixing element opening 43 is arranged in the base holder 4 on the side of the base holder projection 41 facing away from the positioning stop 40 in such a way that its longitudinal axis is angled in the direction of the base holder projection 41. A fixing element 431 is arranged in this fixing element opening 43, said fixing element 431 partially protruding from the fixing element opening 43. The protruding end of the fixing element 431 ends in a pin that can spring back into the fixing element 431. As depicted in FIG. 8a, each change holder 3 has a change holder connection opening 33 on its underside. Furthermore, it has a screw opening 34 on its end facing away from the lathe tool 31. When the change holder 3 is to be positioned on the base holder 4, then the base holder projection 41 is moved into the change holder connection opening 33, and the screw head 422 is moved into the screw opening 34. Here, the pin of the fixing element 431 interlocks in an extension of the fixing element opening 43 in the change holder 3, such that the undercut of the base holder projection 41 is pressed against an undercut of the change holder connection opening 33. In this manner, the change holder 3 and the base holder 4 are connected to each other in the manner depicted in FIG. 8b. By rotating the screw head 422 by 180°, the eccentric screw 421 is tightened. As depicted in FIG. 8c, this leads to the undercuts of the change holder connection opening 33 and the base holder projection 41 now being moved yet further on one another, such that the change holder 3 is fixedly spanned on the base holder 4. The change holder 3 and the base holder 4 have guiding elements, data carriers, coolant channels and coolant channel openings, as they have been respectively described for the first two exemplary embodiments of the change holder 1 and the base holder 2. By tightening the eccentric screw 421, the change holder 3 is fixedly connected to the base holder in such a way that a fluid-tight connection between the coolant channels can be created.

Figure 9A:
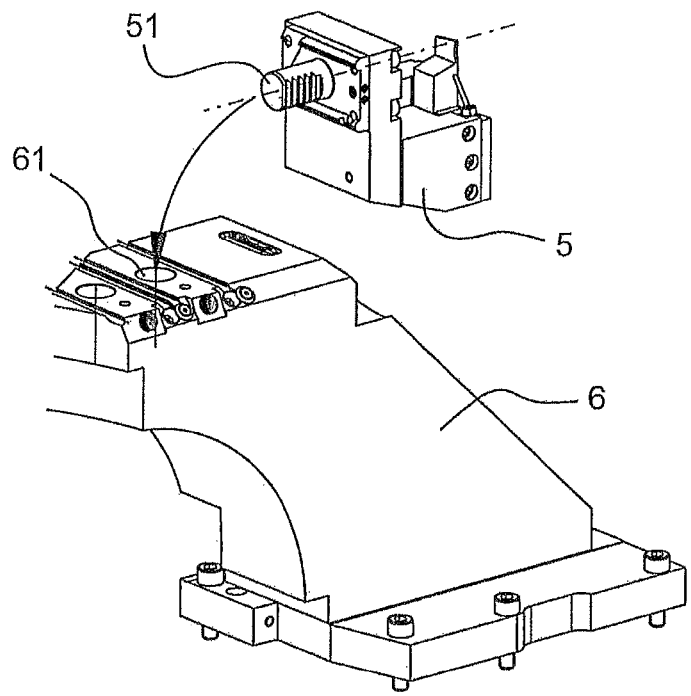
FIG. 9a shows an isometric depiction of a base holder and of a change holder according to yet another exemplary embodiment of the invention.
Figure 9B:
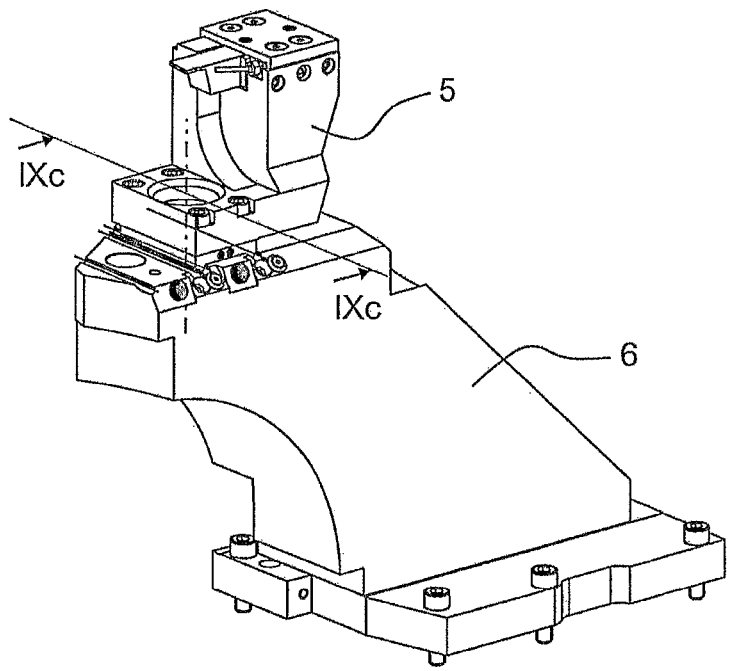
FIG. 9b shows in an isometric depiction how the base holder according to FIG. 9a is arranged on the change holder.
Figure 9C:
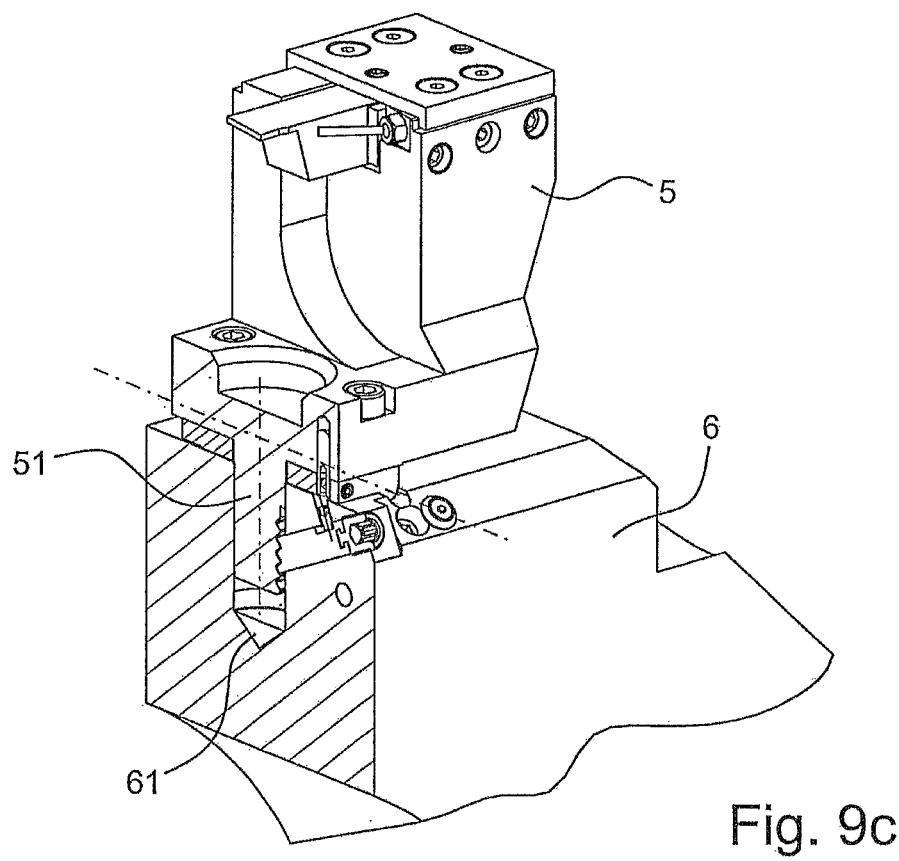
FIG. 9c shows a sectional depiction of the base holder and of the change holder along the line IXc-IXc in FIG. 9b.
Figure 10A:
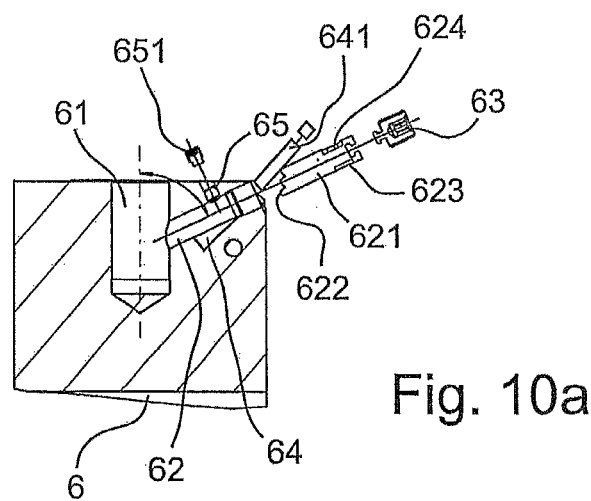
FIG. 10a shows a sectional depiction of the base holder according to FIG. 9a in a first arrangement position.
Figure 10B:
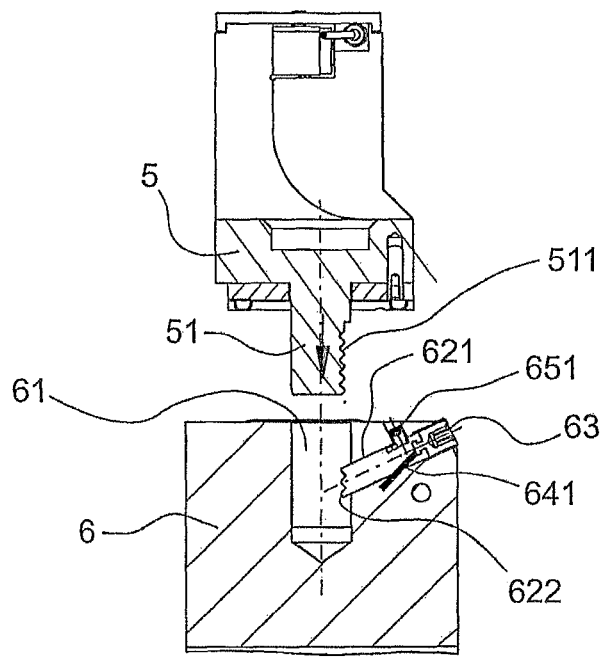
FIG. 10b shows a sectional depiction of the base holder and of the change holder according to FIG. 9a in a second arrangement position.
Figure 10C:
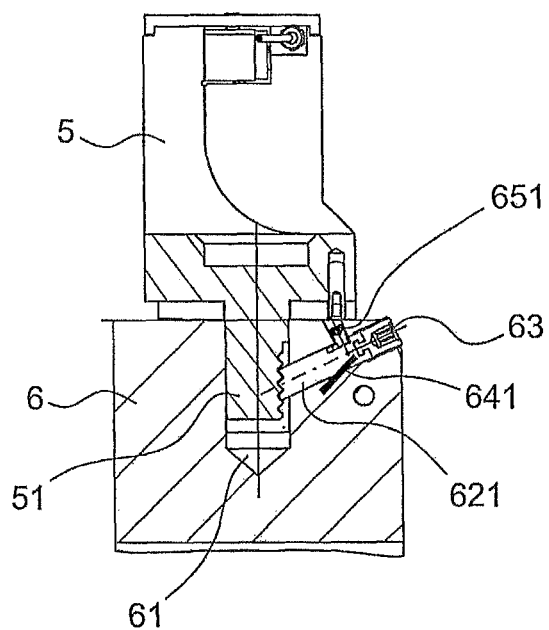
FIG. 10c shows the base holder and the change holder according to FIG. 9a in a third arrangement position.

In FIGS. 9a to 9c, a change holder 5 and a base holder 6 are depicted according to an exemplary embodiment of the invention, which are suitable for multi-spindle machines. This change holder 5 also has change holder guiding elements, a change holder coolant channel, a change holder coolant channel opening and a data carrier, as it has been described for the first two exemplary embodiments. The base holder 6 has base holder guiding elements, a base holder coolant channel and a base holder coolant channel opening, as they have been described for the first two exemplary embodiments of the base holder 2. It is depicted in FIGS. 10a to 10c how the change holder 5 can be fixed on the base holder 6. The change holder 5 has a cylindrical fixing element 51 which is arranged between its two change holder guiding elements and is orthogonal on the underside of the change holder 5. A side of the fixing element 51 is flattened and has engaging elements 511 in the form of a set of teeth, wherein the individual teeth are orthogonal on the longitudinal axis of the fixing element 51. A receiving region 61 is arranged in the base holder 6 between its base holder guiding elements, said receiving region having a cylindrical region, whose inner diameter corresponds to the outer diameter of the cylindrical fixing element 51. A fastening channel 62 runs through the base holder 6 at an angle to the longitudinal axis of the receiving region 61. As depicted in FIG. 10b, a fastening pin 621 is introduced into the fastening channel 62 before introduction of the fixing element 51 into the receiving region 61 in such a way that it does not yet extend into the receiving region 61. The fastening pin 621 is cylindrical and does not have an external thread. It is bevelled on its end facing away from the receiving region 61 in such a way that its end face runs vertically. Second engaging elements 622 in the form of a set of teeth are arranged on this end face. The teeth run horizontally. After introducing the fixing element 51 into the receiving region 61, a threaded head 63 having an outer thread is tightened in a region of the fastening channel 62, which has an inner thread, in such a way that the fastening pin 621 is moved into the receiving region 61. As a result, the second engaging elements 622 engage with the first engaging elements 511 running in parallel to them and draw the fixing element 51 vertically deeper and deeper into the receiving region 61 until the change holder guiding elements are fixedly pressed into the base holder guiding element in such a way that a fluid-tight connection between the coolant channels is created. This is depicted in FIG. 10c. In order to be able to remove the fastening pin 621 again from the fastening channel 62 such that the change holder 6 can be separated from the base holder 5, a spring channel 62 is arranged in the base holder 6 in such a way that it is angled relative to the longitudinal axis of the fastening channel 62 and ends in this. Yet before introducing the fastening pin 621 in the fastening channel 62, a spring element 641 in the form of a spiral spring having a stopping head is introduced into the spring channel 64. It engages with its stopping head into a spring opening 623 of the fastening pin 621. Now, when the threaded head 63 is removed, then the spring element 641 eases and here pushes the fastening pin 621 partially out of the fastening channel 62, such that it can then be gripped and completely removed from the fastening channel 62. Furthermore, a securing opening 65 runs orthogonally to the longitudinal axis of the fastening channel 62 through the upper side of the base holder 6. After the fastening pin 621 has been arranged in the fastening channel 62 and secured there from springing out by means of the threaded head 63, an anti-twist device 651 is rotated into a securing region 624 of the fastening pin 621 through the securing opening in order to prevent a rotation of the fastening pin 621 in the fastening channel 62. In this way, it is ensured that the second engaging elements 622 are not rotated from the horizontal. The anti-twist device 651 do not prevent the fastening pin 621 being moved into the receiving region 61 by a further rotation of the threaded head 63.

The invention claimed is:

1. A device for holding tools for processing machines, having at least one change holder and a base holder, wherein each change holder has two change holder guiding elements which are in engagement with base holder guiding elements of the base holder, and wherein each change holder has a change holder coolant channel which has a change holder coolant channel opening in one of the change holder guiding elements, said change holder coolant channel being in fluid communication with a base holder coolant channel opening of a base holder coolant channel which is arranged on a base holder guiding element
    wherein
        first guiding elements, which are either the change holder guiding elements or the base holder guiding elements, have a convex semi-circular cross section which
            (i) has a flattened region which contains the vertex of the semicircle, or
            (ii) two widened regions which are arranged mirror-symmetrically on the semicircle, and
        second guiding elements, which are guiding elements which are in engagement with the first guiding elements, have a concave circular sector-shaped cross section having a centre angle of less than 180°.

2. The device according to claim 1, wherein the flattened region has a center angle ranging from 10° to 12°.

3. The device according to claim 1, wherein the center of each widened region forms an angle ranging from 40° to 65° with the vertex of the semicircle.

4. The device according to claim 1, wherein
    (i) the convex semi-circular cross section is flattened in the flattened region at the vertex of the semicircle by a flattening (a) of 4 µm to 8 µm with respect to the semicircle, or
    (ii) the convex semi-circular cross section is widened at the center of each widened region by a widening of 4 µm to 8 µm with respect to the semicircle.

5. The device according to claim 1, wherein the center angle of the concave circular sector-shaped cross section ranges from 140° to 144°.

6. The device according to claim 1, wherein a linear section of the cross section is connected to both ends of the concave circular sector-shaped cross section in each case.

7. The device according to claim 6, wherein the angle of a connection between the vertex of the concave circular sector-shaped cross section and the circle center of the circular sector and the linear sections ranges from 16° to 20° in each case.

8. The device according to claim 1, wherein at least one change holder coolant channel opening has the shape of an elongated hole, the longitudinal axis of which runs along the longitudinal axis of its change holder guiding element and/or at least one base holder coolant channel opening has the shape of an elongated hole, the longitudinal axis of which runs along the longitudinal axis of its base holder guiding element.

9. The device according to claim 1, wherein the first guiding elements are change holder guiding elements and the second guiding elements are base holder guiding elements.

10. The device according to claim 9, wherein each change holder has one data carrier which is arranged at least partially in a change holder guiding element which does not have a change holder coolant channel opening.

11. The device according to claim 9, wherein each change holder has, between their respective two change holder guiding elements, a change holder connection opening with an undercut, said change holder connection opening engaging with a base holder projection of the base holder which is arranged between two base holder guiding elements, and the base holders each have one eccentric screw per change holder, the screw head of which being arranged in a screw opening of a change holder and the screw shaft of which being arranged in a linear threaded opening of the base holder, wherein the longitudinal axis of the threaded opening runs at an angle in the direction of the base holder projection.

12. The device according to claim 11, wherein a fixing element is arranged in a linear fixing element opening which runs through the base holder and a change holder in such a way that it ends on the side, facing away from the threaded opening, of the change holder connection opening in the change holder, wherein its longitudinal axis runs at an angle in the direction of the base holder projection.

13. The device according to claim 9, wherein each change holder has one fastening element, having first engaging elements, which is arranged in a receiving region of the base holder in each case, and in each case one fastening channel runs through the base body in such a way that it ends in the receiving region, wherein a fastening pin is arranged in the fastening channel which has second engaging elements which engage with the first engaging elements.

14. The device according to claim 13, wherein a threaded head having an external thread is arranged in the fastening channel on the end of the fastening pin which faces away from the receiving region, and a spring channel is arranged in the base body in such a way that it ends in the fastening channel, wherein a spring element is arranged in the spring channel in such a way that it engages with a spring opening of the fastening pin.

* * * * *